United States Patent
Aciicmez et al.

(10) Patent No.: US 8,458,765 B2
(45) Date of Patent: Jun. 4, 2013

(54) BROWSER SECURITY STANDARDS VIA ACCESS CONTROL

(75) Inventors: Onur Aciicmez, Santa Clara, CA (US); Swaroop S. Kalasapur, Santa Clara, CA (US); Yu Song, Pleasanton, CA (US); Doreen Cheng, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 679 days.

(21) Appl. No.: 12/643,878

(22) Filed: Dec. 21, 2009

(65) Prior Publication Data

US 2011/0138174 A1  Jun. 9, 2011

Related U.S. Application Data

(60) Provisional application No. 61/267,370, filed on Dec. 7, 2009.

(51) Int. Cl.
*H04L 29/06* (2006.01)

(52) U.S. Cl.
USPC ................................................ 726/1; 726/29

(58) Field of Classification Search
USPC ................... 726/22, 29, 1; 713/164
See application file for complete search history.

(56) References Cited

U.S. PATENT DOCUMENTS

| | | | |
|---|---|---|---|
| 6,691,176 B1 * | 2/2004 | Narin et al. | 719/318 |
| 7,696,731 B2 * | 4/2010 | Huang et al. | 323/222 |
| 7,698,731 B2 * | 4/2010 | Johnson et al. | 726/1 |
| 7,730,114 B2 * | 6/2010 | Bybee et al. | 707/825 |
| 2005/0257250 A1 * | 11/2005 | Mitchell et al. | 726/3 |
| 2007/0136579 A1 * | 6/2007 | Levy et al. | 713/168 |

OTHER PUBLICATIONS

Grier et al., "Secure Web Browsing with the OP Web Browser", Dept. of Computer Science, University of Illinois at Urbana-Champaign; May 18, 2009, 15 pages.

* cited by examiner

*Primary Examiner* — Ali Abyaneh
(74) *Attorney, Agent, or Firm* — Kenneth L. Sherman, Esq.; Michael Zarrabian, Esq.; Sherman & Zarrabian LLP (57) ABSTRACT

A computing system is operable to contain a security module within an operating system. This security module may then act to monitor access requests by a web browser and apply mandatory access control security policies to such requests. It will be appreciated that the security module can apply mandatory access control security policies to such web browser access attempts.

18 Claims, 5 Drawing Sheets

BROWSER SECURITY STANDARDS VIA ACCESS CONTROL

CROSS-REFERENCE TO RELATED APPLICATIONS

This application claims the benefit of priority to U.S. Provisional Patent Application Ser. No. 61/267,370, filed on Dec. 7, 2009, entitled BROWSER SECURITY STANDARDS VIA MANDATORY ACCESS CONTROL, which is incorporated herein by reference in its entirety for all purposes.

BACKGROUND OF THE INVENTION

A web browser is a software application for retrieving, presenting, and traversing information resources on the World Wide Web. An information resource is identified by a Uniform Resource Identifier (URI) and may be a web page, image, video, or other piece of content. Hyperlinks present in resources enable users to easily navigate their browsers to related resources.

Original web browsers were static in nature, designed to only render hyperlinked documents in a straightforward manner. Later, scripting protocols such as JavaScript were developed, which allowed scripts to be embedded in the resource to provide simple dynamic functionality, such as user interaction and animated menus.

AJAX, which is shorthand for asynchronous JavaScript and Extensible Markup Language (XML) is a group of interrelated web development techniques used on the client-side to create interactive web applications. The use of AJAX techniques has led to a dramatic increase in interactive or dynamic interfaces on web pages.

Today, AJAX applications can rival desktop applications when it comes to speed and performance.

Figure 1:
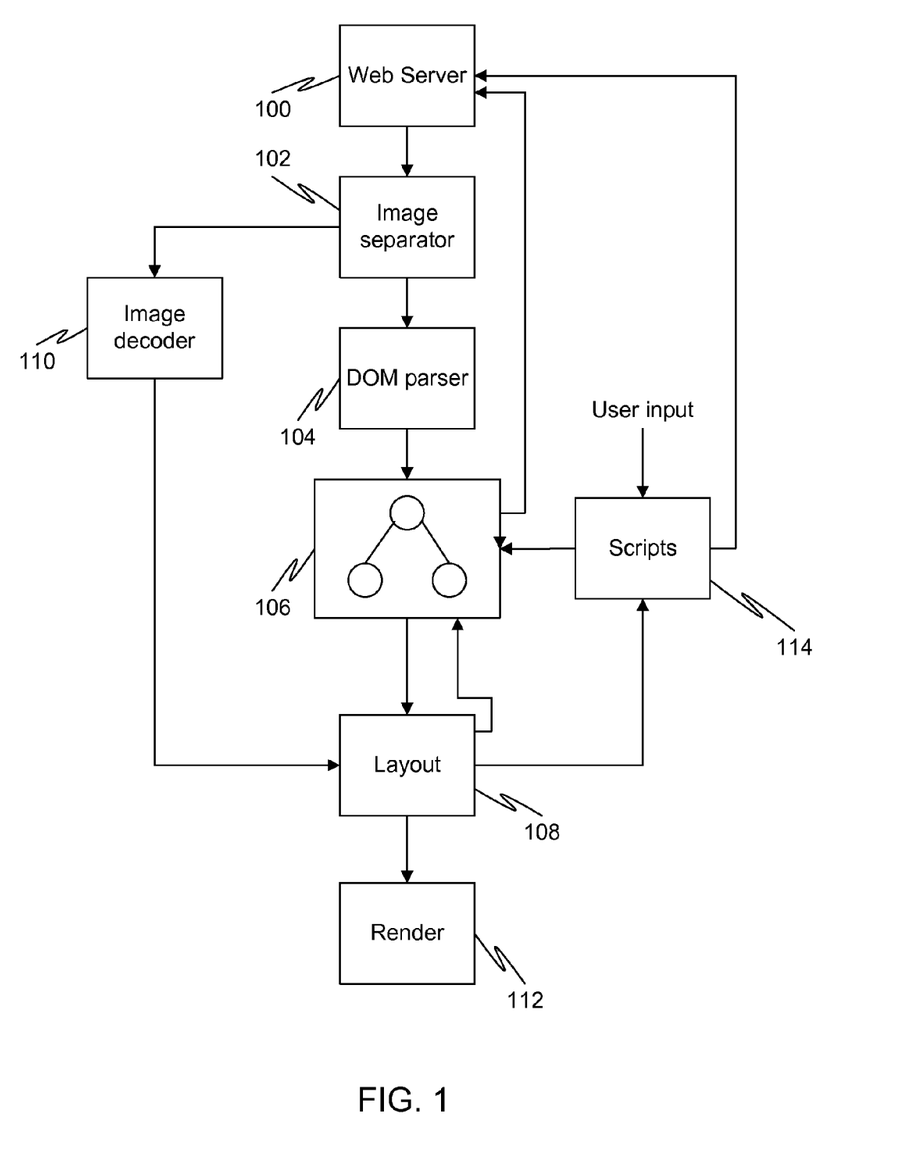
FIG. 1 is a diagram illustrating the operation of a typical web browser.

FIG. 1 is a diagram illustrating the operation of a typical web browser. A resource, such as a web page, is downloaded from a web server 100. Images from the web page are separated out by an image separator 102. The web page is then fed to a document object model (DOM) parser 104, which parses the web page into a DOM data structure (commonly referred to as a DOM tree) 106. The DOM tree 106 is an abstract syntax tree of the document. Content referenced by the web page is then fetched from the web server 100 and in-lined into the DOM. As the content necessary to display the page is downloaded and decompressed, the web page becomes available for viewing. Typically the web page layout is incrementally solved and drawn to the screen. A layout module 108 performs the laying out of the elements of the web page, along with images decoded by image decoder 110. A rendering module 112 then renders the web page in the browser window.

After the initial page load, scripts 114 (written in, for example, JavaScript) respond to events (such as events generated by user input or server messages). The scripts can then rewrite the DOM tree 106 based on the events. This, in turn, causes the page layout to be recomputed and redrawn.

The primary use of JavaScript is to write functions that are embedded in web pages and interact with the DOM tree of the page. Typically such scripts are delineated by the <script> and </script> tags. Some examples of script functionality include:

Opening or popping up a new window with programmatic control over the size, position, and attributes of the new window (e.g., whether the menus, toolbars, etc. are visible).

Validation of web form input values to ensure that they will be accepted before they are submitted to the server.

Changing images as the mouse cursor moves over them (e.g., to draw the user's attention to important links displayed as graphical elements).

Because JavaScript code can run locally in a user's browser (rather than needing to execute on a remote server), it can respond to user actions quickly, making the browser seem more responsive. It is this responsiveness that has allowed browsers to progress from the stage of merely displaying static web pages, to acting as full-blown applications of their own. Indeed, many types of tasks typically reserved for stand-alone applications, such as word processing tasks, spreadsheet tasks, and media player tasks can now be executed from within a browser itself without requiring stand-alone applications. These are referred to as web applications, even though their execution may require little or no interaction with the World Wide Web.

JavaScript can also detect user actions which HyperText Markup Languages (HTML) alone cannot, such as individual keystrokes. Applications such as Gmail take advantage of this, as much of its user-interface is written in JavaScript, and JavaScript dispatches requests for information (such as the content of an e-mail message) to the server.

A JavaScript engine (also known as a JavaScript interpreted or a JavaScript implementation) interprets JavaScript source code and executes the script accordingly. Most commonly this engine executed from within a web browser. Web browsers usually use a public Application Programming Interface (API) to create host objects responsible for reflecting the DOM tree into JavaScript.

Security is a big concern when it comes to interaction with networked computers, and with the Internet in particular. Access to various resources must be controlled in order to prevent malicious or accidental misuse of such resources. JavaScript and other dynamic runtime environments allow various actions that present security risks. These actions include:

Accessing cookies
Communication with a web server
Accessing local resources on the host device
Accessing DOM elements of a web page The World Wide Web Consortium (W3C) standardizes security access rules for these types of actions. One such standardization is known as the "same origin policy". The term "origin" refers to a triple of (domain name, protocol, and port number) of a web page containing a particular script or resource. According to the same origin policy, two resources must have identical triples in order to be considered as being of the same origin. Only resources with the same origins are permitted to access resources associated with each other.

Cookies are handled differently than network accesses. A cookie is a small file stored on a user's computer by a web browser and includes one or more name-value pairs containing bits of information such as user preferences, shopping cart contents, the identifier for a server-based session, or other data used by websites. It is sent as an HyperText Transfer Protocol (HTTP) header by a web server to a web browser and then sent back unchanged by the browser each time it accesses that server. A cookie can be used for authenticating, session tracking (state maintenance), and remembering specific information about users, such as site preferences or the contents of their electronic shopping carts.

Rather than the (domain name, protocol, and port number) triple, access permissions for cookies rely on path information. Two paths must be identical in order for the JavaScript running on a web page of the first path to access a cookie of a web page of the second path. For example:
www.example.com/dir/page.html and
www.example.com/dir2/other.html
are two different paths and JavaScript running on the first page cannot directly access the cookie of the second, even though they have the same "origin" according to the same origin policy rules outlined above.

Local resources that can be accessed by JavaScript or other web scripting languages include local devices such as Global Positioning (GPS) units, cameras, etc. Such devices are commonplace now on cellular phones, which have now become popular web surfing platforms. The local resources also includes local file systems. W3C does not yet have a set of concrete access control rules for these types of accesses yet.

Existing access control checks are performed inside the web browser application itself. In other words, the web browser applications keep track of each page's origin, path, etc. and their access requests and make security decisions based on this information. This requires that the design of the web browser include security modules to handle such processing, which complicates the browser design. It also creates security problems. If a malicious page or web application can compromise a browser (e.g., via a buffer overflow), it can circumvent these security checks and gain full access to all browser data, including cookies or passwords of other pages. This would then also allow the malicious page or web application to access the local resources, which can have a devastating effect on the functioning of the user's device and compromise the user's privacy.

Plug-in support mechanisms cause additional security issues in browsers. A plug-in (also called a plugin, addin, add-in, addon, add-on, snap-in, or snapin) is a computer program that interacts with a host application (a web browser or email client, for example) to provide a certain, usually very specific, function on demand. Common plug-ins include Flash, QuickTime, Silverlight, etc.

Plug-ins run in the same address space as the web browser. Thus, there is no distinction between the primary browser code and the plug-in in terms of capabilities. In other words, a plug-in can access every system resource that a browser can access, including cookies, password files, and local resources. Since plug-ins are usually created and/or distributed by third-parties (i.e., parties other than the creator of the web browser), the threat that malicious code can be imported into the browser code via a plug-in is very high, as users aren't always as careful as they should be about which plug-ins they install.

SUMMARY OF THE INVENTION

Broadly speaking, the invention relates to computing systems and computing environments. More particularly, the invention pertains to techniques for applying access control techniques to web browsers. Specifically, such access control techniques may be applied in the operating system.

A computing system can be operable to contain a security module within an operating system. This security module may then act to monitor access requests by a web browser and apply security policies to such requests. It will be appreciated that the security module can apply access control security policies to such web browser access attempts.

When an operating system service request is received from an instance of a web browser, hooks in the operating system kernel may act to invoke the security module. This invocation might occur just prior to, or simultaneously with, the running of the operating system service request. The security module may then retrieve a security context related to the resource to which the operating system service request is attempting to access. This security context may then be used to apply an access control security policy based upon the security context and based upon information regarding the instance of the web browser. The security policy grants access to the resource if a property or properties of the security context match a property or properties of the instance of the web browser.

The storage of the security context in the operating system may be accomplished via various different embodiments. In one embodiment, the security context is stored using an extension to an existing file stored in a file system of a kernel of the operating system. In another embodiment, the security context is stored as a stand-alone file in a file system of the kernel of the operating system. In another embodiment, the security context is partially stored using an extension to an existing file stored in a file system of the kernel of the operating system, and partially stored as a stand-alone file in the file system.

The security policy itself may vary in what it allows. In one embodiment, if the resource is a cookie file, then the security policy is a same path security policy. In other words, if the resource is a cookie file, then the cookie file associated with a script located at one path can only be accessed by requesters sharing the same path. In another embodiment, if the resource is a network access, then the security policy is a same origin security policy. In other words, if the resource is a network access, then the resource can only be accessed by requestors sharing the same origin.

The invention can be implemented in numerous ways, including, for example, a method, an apparatus, a computer readable (and/or storable) medium, and a computing system (e.g., a computing device). A computer readable medium can, for example, include and/or store at least executable computer program code stored in a tangible form. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As noted in the background section, access control checks are handled inside web browsers. This can create security issues in that a breach of security inside any aspect of the web browser, including plug-in modules that contain third party code, can cause a breach of the entire security of the system. As such, there is the very real danger that resources that should only be available to particular users and/or web browser instances may become accessible to malicious third party users and/or web browser instances.

In an embodiment of the present invention, a separation is created between the monitoring/enforcement of such access control checks and the execution of the processes being monitored. This prevents a compromise or corruption in a web browser application from rendering the security mechanisms useless. Resources typically accessible by the executions of the processes are protected from malicious processes by this additional layer of security protection.

In an embodiment of the present invention, Mandatory Access Control (MAC) or other access control mechanisms are used to overcome the limitations and shortcomings of the prior art. More particularly, the access control checks are performed by an operating system (OS) rather than a web browser. These access control checks may also be performed using MAC mechanisms. This allows a security module of an operating system to monitor the execution of a web browser without a breach of the web browser compromising the security module.

MAC refers to a type of access control where the operating system assigns security labels or classifications to system resources and allows access only to entities (people, processes, threads, devices) with distinct levels of authorization. These controls are enforced by the operating system. Whenever an entity attempts to access a resource, an authorization rule enforced by the operating system examines these security attributes and decides whether or not to grant the access. Any operation by the entity on any resource will be tested against the set of authorization rules (also known as policies) to determine if the operation is allowed. The strictness of the security mechanisms makes mandatory access control quite common in military and other high-security computing systems.

Mandatory access control typically has the security policy centrally controlled by a policy administrator. Individual users typically do not have the ability to override the policy and, for example, grant access to files that would otherwise be restricted. This can be contrasted with discretionary access control (DAC).

Discretionary access control is popular in commercial operating systems such as UNIX and Windows. DAC takes a totally different approach, placing control of an object into the hands of the person who creates it. For example, if user1 creates a file on a Windows server, he becomes the owner of that new file. The owner identification is tracked as part of a security descriptor that the file system maintains for the file. The owner is implicitly granted permission to read the security descriptor and change the access control list for the file.

In other words, discretionary access control means that each object has an owner and the owner of the object gets to choose its access control policy.

Linux is a generic term referring to Unix-like computer operating systems based on the Linux kernel, which was developed as a free and open source software collaboration permitting all the underlying source code to be used, freely modified, and redistributed, both commercially and non-commercially, by anyone under licenses.

Linux has gained popularity for server implementations, however its popularity is also growing on other computing devices, including mobile devices such as mobile phones, laptop computers, etc.

It should be noted that this document will describe the invention as if it is implemented in Linux. While one embodiment is implemented in Linux, nothing in this document or the fact that Linux is described in detail shall be construed as limiting the scope of protection of the patent to Linux embodiments. Indeed, it is foreseen that the present invention could apply to a number of different operating systems.

MAC mechanisms in Linux are implemented through a Linux Security Modules (LSM) framework. LSM is a computing framework for Linux that allows the Linux kernel to support a variety of computer security models while avoiding favoritism toward any single security implementation. LSM was designed to provide everything that is needed to successfully implement an access control module, while imposing the fewest possible changes to the Linux kernel. LSM inserts "hooks", which are upcalls to the LSM, at every point in the kernel where a user-level operating system service request is about to result in access to an important internal kernel object such as inodes and task control blocks. An operating system service request is a request that attempts to access a resource of the operating system. This request may be, for example, a system call.

An inode stores information about a regular file, directory, or other file system object. This information can include basic details such as user and group ownership, access mode (read, write, execute permissions) and type of file, but also could include additional details such as the length of the file in bytes, device identification, file mode, timestamps telling when the inode itself was last changed, the file content last changed, and last accessed, a link count indicating how many hard links point to the inode and pointers to disk blocks that store the file's contents.

A task control block (TCB), also known as a process control block (PCB) is a data structure in the operating system kernel containing the information needed to manage a particular process. This information might include a process identifier, register values, an address space, priority information, process accounting information, a pointer to a next PCB, and I/O information.

LSM provides a general-purpose framework for security that allows security modules to be implemented as loadable kernel modules. Kernel code is modified to invoke hook functions prior to accessing internal objects. Different MAC mechanisms can be implemented as loadable modules. Examples of loadable security modules include SELinux, Smack, and TOMOYO, all of which can be loaded into the kernel on demand.

Each security module registers its own hook functions with the kernel. A kernel data structure, such as security_ops, contains function pointers for each hook function. A security module implements some or all of these hook functions, populates the data structure with the pointers to its functions, and then passes this data structure to the kernel for registration. The kernel then asks the security modules, prior to accessing internal objects, for access decisions by invoking the appropriate hook function. The security modules can analyze the access requests in these hook functions and either permit or prohibit the access. The kernel is module-agnostic, but provides a powerful framework for modules to operate seamlessly.

Figure 2:
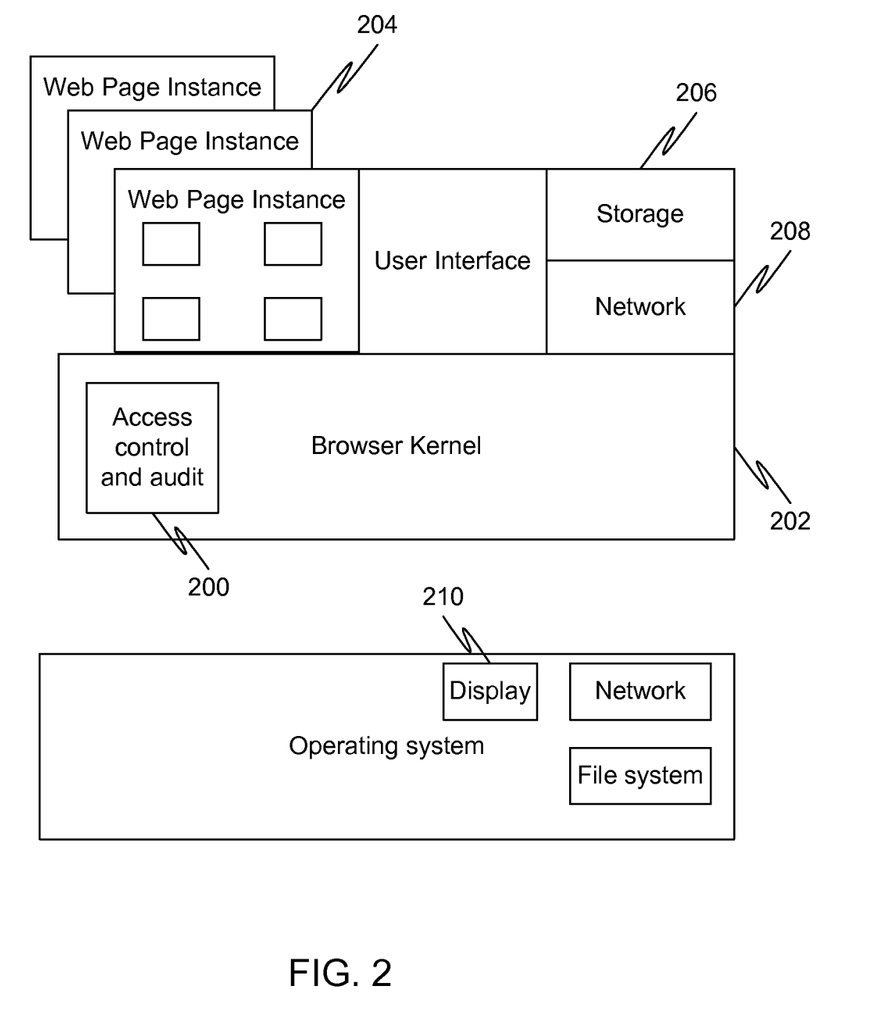
FIG. 2 is a diagram illustrating the overall OP architecture.

OP is a new browser architecture that separates security monitoring mechanisms from the browser instances themselves. Different browsing entities are put in different processes to take advantage of process-level isolation mechanisms. FIG. 2 is a diagram illustrating the overall OP architecture. As can be seen, access control and auditing 200 can be performed in a browser kernel 202, which is separated from the web page instances 204. In this architecture, storage control 206, network control 208, and display control 210 are put in different processes (subsystems) and separated from the web page or application instances. The browser kernel 202 controls the interactions between these web pages instances 204 and the storage control 206, network control 208, and display control 210 mechanisms.

However, the browser kernel itself is still vulnerable to security breaches as it remains part of the browser. As such, while having the security features located in the browser kernel provides moderate levels of security, especially compared with prior art solutions where the security aspects were managed by the browser instances themselves, the overall vulnerability of the system still remains high.

Therefore, in an embodiment of the present invention, a security module for web browser execution is placed in the operating system, distinct and separate from the web browser instances and the web browser kernel (if any).

Embodiments of these aspects of the invention are discussed below with reference to FIGS. 3-5. However, those skilled in the art will readily appreciate that the detailed description given herein with respect to these figures is for explanatory purposes as the invention extends beyond these limited embodiments.

Figure 3:
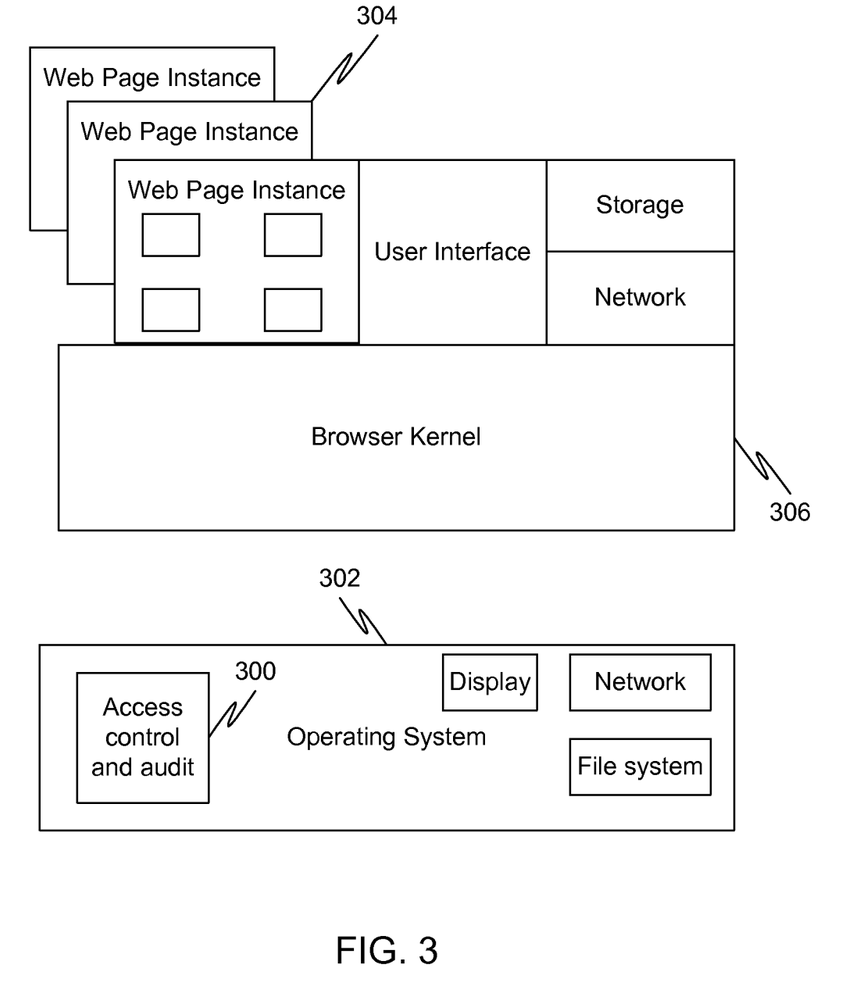
FIG. 3 is a diagram illustrating a web browser architecture in accordance with an embodiment of the present invention.

FIG. 3 is a diagram illustrating a web browser architecture in accordance with an embodiment of the present invention. As can be seen, an access control module 300 is placed in the operating system 302 itself, distinct from the web page instances 304 or browser kernel 306. By moving the browser-related security features to the operating system, the overall security level of the system is vastly increased, as malicious or corrupt code that has infiltrated the web page instances 304 or browser kernel 306 cannot access the access control mechanisms and gain control of additional resources.

Running the access control module 300 from inside the operating system itself, however, is a non-trivial task. While each web page or application instance can still be run as a separate process, mechanisms must be in place to store browser security related information in the operating system, update such information at runtime, and enforce browser security rules using such information.

Processes and/or threads (i.e., running entities) are "subjects" in access control terms. The Linux kernel keeps records of security properties (also known as the security context) of each process or thread. In other words, each subject has a security context associated with it. The security context of a task is stored in its process control block. In the Linux kernel, the process control block is called the task_struct object.

Each security context can be broken into two categories: the objective context portion and the subjective context portion. The objective context portion of a task includes any portion used when another task is attempting to access or affect this task. The subjective context portion of a task include any portion used when the task is attempting to act upon another object (e.g., a file, task, key, etc.).

A task has two security pointers. The first, task->real_cred, points to the objective context portion. The second, task->cred, points to the subjective context portion. These pointers are stored in a task's PCB. Additionally, a void pointer, cred->security, is typically provided to allow for custom security credentials. This pointer is commonly used by add-on security modules. For example, SELinux uses its own security credentials and sets cred->security to the structures containing these credentials.

In an embodiment of the present invention, the void pointer is utilized to point to a security module located in the operating system. This allows the security module of the present invention to be easily integrated into a Linux environment with the minimum of complexity.

In addition to altering the pointers so that the security module is referenced, in an embodiment of the present invention the browser related security information is stored in the operating system kernel by the security module.

Keeping records of browser security related information in a security module in the operating system requires mechanisms to store such information. In an embodiment of the present invention, custom data structures are utilized to store such information. While there are a number of different ways such data structures can be implemented, one way is described below.

A novel data structure, called webinstance_browserOS, can be created as follows:

```
struct webinstance_browserOS {
    char        *webins_path;
    char        *webins_domain;
    int         webins_port;
    int         webins_protocol;
    ....
    ....
};
```

Of course, depending upon the general architecture of the system, the data structure could contain some or all of the fields illustrating above (among others). Indeed, the security context may include any information that might be relevant to the determination of whether or not a requestor such as a web application instance or process is permitted to access a resource.

Generally speaking, the security context of a web application instance refers to the collaborative context of the processes/threads in the web application instance. In other words, the security context of a web application instance can be distributed to security contexts of the processes in this web application instance. Thus, the security context of a web application instance would include all such process security contexts.

Furthermore, in an embodiment of the present invention, additional custom data structures are provided to keep information regarding files, file systems, network sockets, etc. Linux MAC mechanisms such as SELinux and Smack keep different data structures for different kernel objects. For example, the following structures are defined by Smack for network sockets and file inodes:

```
struct socket_smack {
    char        *smk_out;                    /* outbound label */
    char        *smk_in;                     /* inbound label */
    char        smk_packet[SMK_LABELLEN];    /* TCP peer label */
};
/*
 * Inode smack data
 */
struct inode_smack {
    char         *smk_inode;     /* label of the fso */
    struct mutex smk_lock;       /* initialization lock */
    int          smk_flags;      /* smack inode flags */
};
```

In an embodiment of the present invention, distinct properties/security labels are provided for each cookie or item of network traffic so that the operating system can distinguish the assets and interactions/operations of different browser instances/domains. An example of such an implementation is as follows:

```
struct socket_browserOS {
    char            *browserOS_domain;
    int             browserOS _port;
    int             browserOS _protocol;
    char            browserOS_packet[BrowserOS_LABELLEN];
};
struct inode_ browserOS {
    char            * browserOS _path;   /* label */
    struct mutex    browserOS _lock;     /* initialization lock */
    int             browserOS _flags;    /* BrowserOS inode flags */
};
```

Additionally, security contexts of files should be persistent across system startups. In order to accomplish this, the data can be stored in the file system. In an embodiment of the present invention, one of two strategies is used for such storage. The first is to utilize extended attributes. On a typical Linux disk-based file system, each file is identified uniquely by an inode containing critical metadata for the file, including UNIX ownership and access control information. When the kernel references a file, its inode is read from disk into memory. A standard UNIX permission check only uses the information present within the inode. Linux offers extended attributes, however, also called EAs or xattrs. These are name/value pairs associated with files as an extension to normal inode-based attributes. EAs allow functionality to be added to file systems in a standardized way so that interfaces to the attributes are file system-independent. Examples of EA functionality are access control lists (ACLS), storage of character-set metadata alongside file data, and SELinux, Smack, etc. security context labeling. For example, SELinux extends standard UNIX security and uses security context labels to make extended access control decisions. Smack's label of a file system object is stored as an extended attribute named SMACK64, in the file.

Therefore, in an embodiment of the present invention, the extended attribute feature is used to store the new security context of a file in its extended attributes. The exact implementation of such extensions will, of course, depend on the file system's capabilities and formats.

In certain instances, however, it may not be desirable or possible to utilize extended attributes. In Linux, the ext2, ext3, ext4, JFS, RegisterFS and XFS file systems support extended attributes (abbreviated xattr) if the libattr feature is enabled in the kernel configuration. Any regular file may have a list of extended attributes. Each attribute is denoted by a name and the associated data. The name is a null-terminated string, and is prefixed by a namespace identifier and a dot character. Currently, four namespaces exist: user, trusted, security, and system. The user namespace has no restrictions with regard to naming or contents. The system namespace is primarily used by the kernel for access control lists. The security namespace is used by SELinux/Smack, for example.

In those instances where it is not desirable or possible to utilize extended attributes, an embodiment of the present invention stores security context data in a separate secure and protected file in the file system. The security module can then keep a mapping between the files and their security context(s), and then store this mapping in a separate and isolated file.

There are additional possible embodiments for storing the security contexts according to the present invention. For example, the first release of SELinux used a different mechanism for labeling file systems than the extended attributes approach. Persistent security IDs (PSIDs), integer representations of security context labels, were stored in an unused field of the ext12 inode. Mapping files on each file system were used by SELinux to look up a file's PSID by inode, and then map the PSID to a security context label. This functionality can be exploited for an embodiment of the present invention.

Additionally, embodiments are foreseeable that mix two or more of the above-described embodiments. For example, extensions to files may be available to use to store some, but not all, of a security context (or it may not be desirable to store all of the security context using such extensions, for whatever reason). In such an instance, an embodiment is foreseen wherein a portion of the security context is stored using the extensions available, while another portion of the security context is stored as a stand-alone file in the file system.

Turning now to the configuration of the system as a whole, in an embodiment of the present invention, a custom initialization script may be used to run at an early stage of the system startup and play an important role in the configuring of the system. It can initialize the security module and set up the security context of the primary kernel data structures (e.g., ensure that certain devices have the correct attributes). This initialization script may be a part of, or referenced by, a general initialization file used by the device on bootup.

At runtime, the Linux kernel has the LSM framework, which calls the security module hook functions at the right time and place. An embodiment of the present invention takes advantage of this functionality to allow the enforcement of custom security rules. Browser security rules can be implemented inside these hook functions. There are many different hook functions that can be implemented in this fashion. The hook functions may be very implementation-specific, and as such only a few will be mentioned here. One of ordinary skill in the art will recognize, however that the invention should not be limited to the hook functions described herein.

Two of the more important functionalities in an embodiment of the present invention are file access control and network control. The hook function that controls most of the file accesses is known as the inode_permission function (security_operations->inode_permission). Smack implements a function called smack_inode_permission( ) and registers it to the kernel as its inode_permission( ) hook function. Thus, whenever a process tries to access an inode, the kernel calls Smack's smack_inode_permission( ) function. This function calls a smk_of_inode( ) function to retrieve the security contexts of the inode in question and calls another function—smk_curacc( )—which retrieves the security context of the current process. Then the actual security decision function—smk_access( )—is called and this core function checks the labels of the task and inode against the list of security rules. It then makes the decision as to whether or not access is permitted.

An embodiment of the present invention uses such an enforcement strategy for cookie accesses. A hook function, browserOS_inode_permiss( ), is registered to the kernel. When the kernel calls this function during a cookie access, a series of events are triggered. First, the security module gets the security context of the inode in question. Second, the security module determines if this is a cookie file. This may be accomplished by checking the flags in inode_browserOS->browserOS_flags. The security module may also determine if the task is a browser instance at this time. Third, if the security context is a cookie file, the path information is retrieved from the security context of the task and the security context of the inode. If the path labels are matching, access is granted. Otherwise, access is denied.

For network traffic of browser instances, the browser instance makes a request to open a communication channel with a remote host or to send a network packet. Then a security module is called during this request. The security context of the browser instance is then retrieved to get the same origin policy related data of the task. If the request and the security context of the task match the same origin policy rules, the access is allowed. Otherwise, access is denied.

In an embodiment of the present invention, the updating of the security context is also performed by the operating system. The security context of a browser instance can change during runtime. A web application can change its metadata. For example, a web page can change its own path via JavaScript APIs. Such an action requires an update in the security context of the web application instance, otherwise the security checks executed by the security module will be using outdated information during its analysis. In an embodiment of the present invention, the security module monitors the execution of web page instances and prevents any actions that conflict with the security rules and standards, while simultaneously also detecting the requests/actions which cause a change to, for example, path and/or domain of a web application. The security module then updates the security context of the corresponding web application instance accordingly.

In an embodiment of the present invention, the above functionality can also be extended to a cloud computing environment. In a cloud computing environment, resources are distributed across many different computing platforms. In such a system, duplicate security modules may be utilized, one on the machine operated by the user and one on one or more of the distributed computing devices (i.e., the "cloud"). Each security module may then maintain its own duplicate set of security context in the manner that was described above. Additionally, a synchronization mechanism may then be provided to ensure that the duplicates kept by the various security modules are all identical to one another. This synchronization mechanism acts to update all the "versions" of the security context on the duplicate security modules when one of them is updated.

Figure 4:
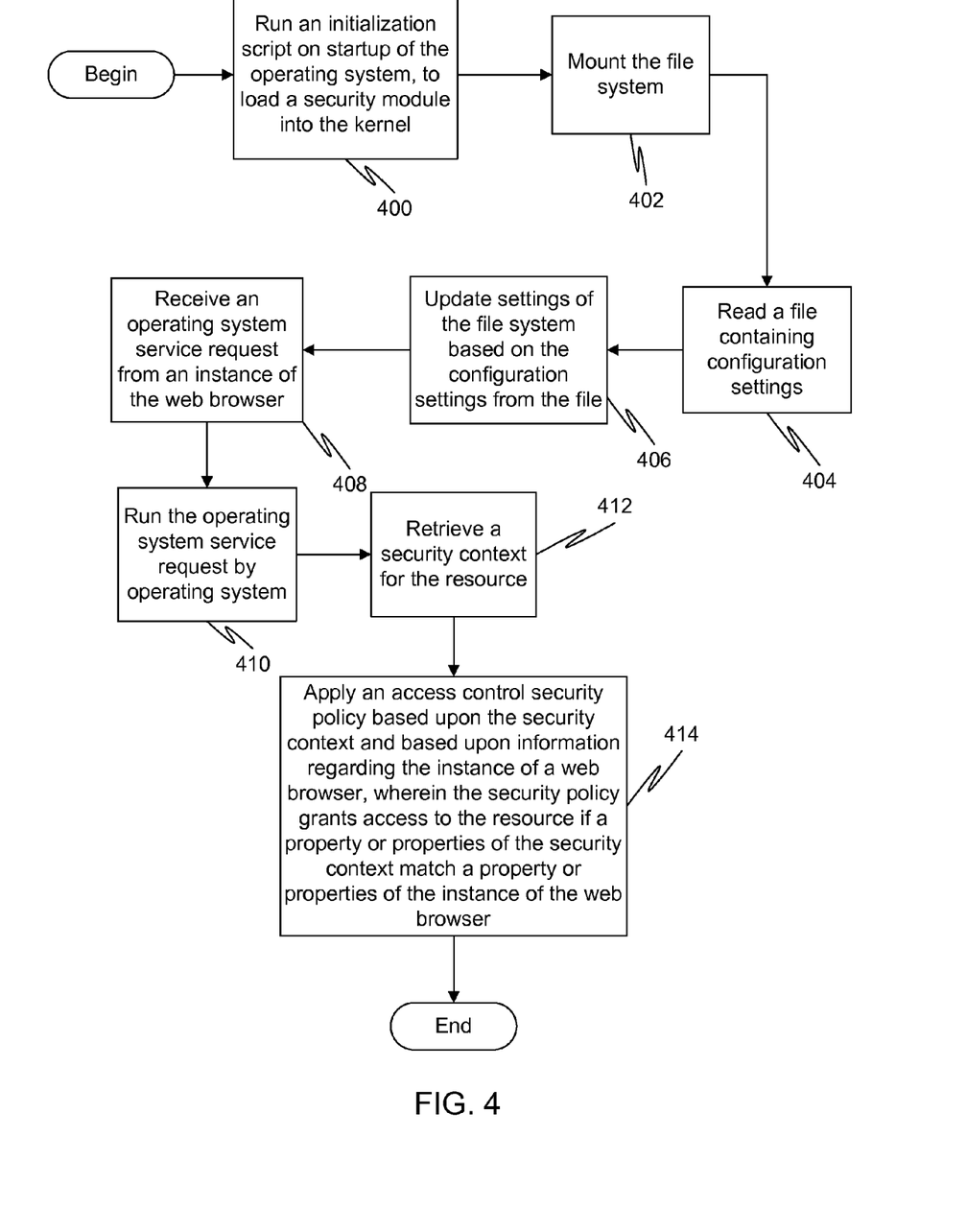
FIG. 4 is a flow diagram illustrating a method for running an operating system in accordance with an embodiment of the present invention.

FIG. 4 is a flow diagram illustrating a method for running an operating system in accordance with an embodiment of the present invention. The method may be run by an operating system. Aspects of the method may be run by a security module operating within the operating system. It should be noted that elements of the operating system may operate in different physical locations within a computer system, and yet still be considered to be a part of one operating system. Indeed, embodiments are even possible where operation of the operating system is shared between two or more hardware devices. Nevertheless, the operating system operates as a distinct module or program from a web browser, if not physically then at least logically.

At 400, on startup of the operating system, an initialization script may be run to load a security module into a kernel of the operating system. The initialization script can be one that has been modified to expressly load the security module. Alternatively, the initialization script can call another script that loads the security module.

At 402, a file system may be mounted. At 404, a file containing configuration settings is read. These configuration settings may indicate how security contexts should be stored in the file system. At 406, settings of the file system are updated based on the configuration settings from the file.

At 408, an operating system service request is received from an instance of a web browser. This operating system service request attempts to access a resource of the computer system. There are many different types of operating system service requests that can attempt to access a resource of a computer system. Examples include an open file command, a write file command, and a read file command. In the larger scheme of things, the web browser may be attempting to access a physical resource of the computer system, such as a GPS module. Alternatively, the web browser may be attempting to access an object, such as DOM elements. Alternatively, the web browser may be attempting to access a cookie. Regardless of the overall intent of the web browser, at some level an operating system service request is invoked to effectuate such an access.

At 410, the operating system service request is run by the operating system. The operating system service request contains an access request for a particular resource. It should be noted that the running of the operating system service request may or may not involve the complete execution of the operating system service request. Specifically, just prior to the substance of the operating system service request being executed, the operating system will perform a security check to determine whether or not the access to the resource is permitted. This security check is described in more detail below with respect to steps 412 and 414. If the security check fails, then the substantive portion of the operating system service request may never actually be executed. Rather, an error message may be sent back to the web browser informing it that the operating system service request is not permitted to access the resource in question. If, on the other hand, the security check indicates that access is permitted, then the substantive portion of the operating system service request may be executed in accordance with a security policy. Thus, the running of the operating system service request at step 410 may only involve running non-substantive portions of the operating system service request (e.g., loading the call into memory) while the substantive portions of the operating system service request are executed, if at all, only once the security check is performed and access is granted.

In order to effectuate this, hooks may be inserted into the operating system code just prior to an operating system service request. As such, upon running of an operating system service request, the hooks may be executed to cause the security module to perform the security checks described in steps 412 and 414.

At 412, a security context is retrieved for the resource. This security context may be stored in the file system of the operating system. There may be a number of different ways that this security context is stored. In one embodiment, the security context is stored using an extension to an existing file stored in a file system of the operating system. In another embodiment, the security context is stored as a stand-alone file in a file system of the operating system. In another embodiment, the security context is partially stored using an extension to an existing file stored in a file system of the operating system, and partially stored as a stand-alone file in the file system.

At 414, an access control security policy is applied based upon the security context and based upon information regarding the instance of a web browser, wherein the security policy grants access to the resource if a property or properties of the security context match a property or properties of the instance of the web browser. This applying of the security policy may be performed by the security module. The security policy itself may vary in what it allows. In one embodiment, if the resource is a cookie file, then the security policy is a same path security policy. In other words, if the resource is a cookie file, then the cookie file associated with a script located at one path can only be accessed by requesters sharing the same path. In another embodiment, if the resource is a network access, then the security policy is a same origin security policy. In other words, if the resource is a network access, then the resource can only be accessed by requestors sharing the same origin.

Figure 5:
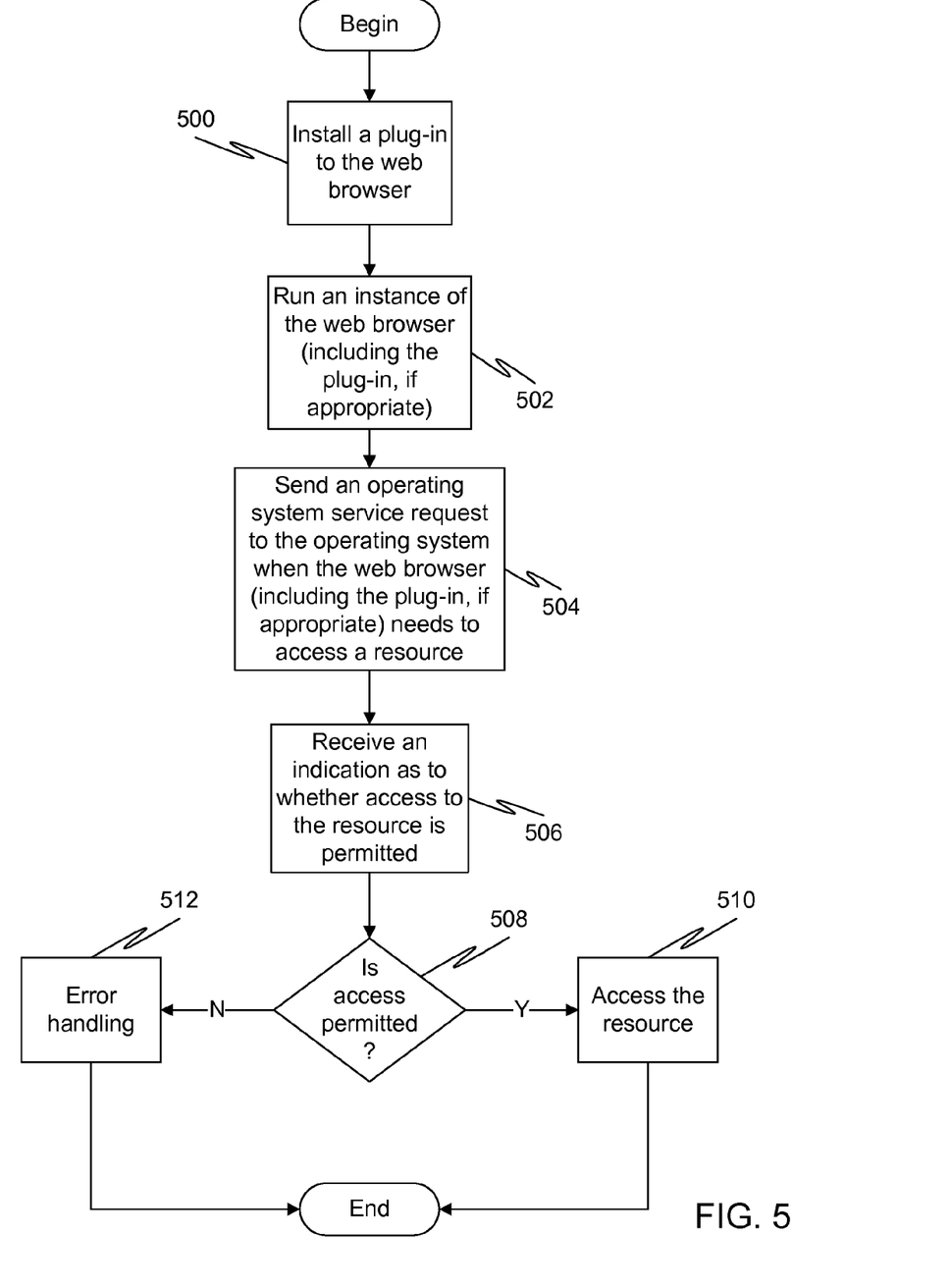
FIG. 5 is a flow diagram illustrating a method for operating a web browser in accordance with an embodiment of the present invention.

FIG. 5 is a flow diagram illustrating a method for operating a web browser in accordance with an embodiment of the present invention. At 500, a plug-in to the web browser may be installed. It should be noted that this plug-in is optional, but if the plug-in is installed, it has access to all the same resources as the web browser itself, and thus has the same security issues. At 502, an instance of the web browser is run (including the plug-in, if appropriate). At 504, an operating system service request is sent to the operating system when the web browser (including the plug-in, if appropriate) needs to access a resource. At 506, an indication is received as to whether the access is permitted. This indication is received from the operating system, and is based upon an access control security policy using a stored security context for the resource and a current context of the instance of the web browser. At 508, it is determined if the indication permits access or not. If so, then at 510, the web browser accesses the resource. Otherwise, at 512, error handling is performed to deal with the rejection of the access of the resource.

The error handling may vary based upon the implementation of the browser. In some embodiments, the user may be alerted that the access to the resource has been rejected. In other embodiments, the web browser may attempt an alternative resource access. In other embodiments, processing of the web page may stop entirely. No matter how the rejection is handled, however, the rejection itself helps to prevent malicious code from corrupting an entire system.

By essentially quarantining the web browser from the access control systems designed to monitor the web browser, an additional level of security is achieved. System-wide mandatory access control is achieved using various embodiment of the present invention. System-wide MAC is much stronger than either DAC and user-level managers. Furthermore, use of various embodiments of the present invention results in much less performance overhead. Inter-process communication and other communication overhead between different subsystems is significantly reduced. Additionally, the browser design is able to be much simpler, as the browser code does not need to contain security enforcement code. The browser also does not have to deal with resource management. As such, the present invention, in its varying embodiments, provide significant benefits over the prior art.

It should be noted that while in one embodiment of the present invention, MAC or MAC-type access control is utilized, embodiments are also foreseeable wherein other types of access control are utilized instead of or in addition to MAC. As such, the claims should not be construed as being limited to MAC unless specifically recited.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for running an operating system on a device, the method comprising:
receiving, from an instance of a web browser, an operating system service request;
running the operating system service request by the operating system, wherein the operating system service request requests access to a resource of the operating system;
retrieving a security context for the resource from a file system of the operating system; and
applying an access control security policy based upon the security context and based upon information regarding the instance of a web browser, wherein the security policy grants access to the resource if a property or properties of the security context match a property or properties of the instance of the web browser.

2. The method of claim 1, wherein the running the operating system service request includes:
calling a hook to a security module prior to an execution of an access of the resource, wherein the security module is located in the operating system.

3. The method of claim 2, wherein the applying of the security policy is performed by the security module.

4. The method of claim 2, further comprising:
on startup of the operating system, running an initialization script to load the security module into a kernel of the operating system.

5. The method of claim 1, wherein the security context is stored using an extension to an existing file stored in a file system of the operating system.

6. The method of claim 1, wherein the security context is stored as a stand-alone file in a file system of the operating system.

7. The method of claim 6, further comprising:
on startup of the operating system:
mounting the file system;
reading a file containing configuration settings to configure the file system to store security contexts as stand-alone files; and
updating settings of the file system based on the configuration settings from the file.

8. The method of claim 1, wherein if the resource is a cookie file, then the security policy is a same path security policy.

9. The method of claim 1, further comprising:
monitoring execution of the instance of the web browser to determine if any changes occur that alter a property of the instance of the web browser that correspond to a property of the security context; and
upon detection of a change to a property of the instance of the web browser, updating that security context to reflect the change.

10. A method for operating a web browser, the method comprising:
running an instance of the web browser;
sending an operating system service request to an operating system when the web browser needs to access a resource of the operating system;
receiving an indication as to whether the access is permitted from the operating system, based upon an access control security policy using a stored security context in a file system of the operating system for the resource and a current context of the instance of the web browser; and
accessing the resource only if the indication permits access to the resource.

11. The method of claim 10, further comprising:
installing a plug-in to the web browser;
wherein the running an instance of the web browser includes running the instance of the web browser including the plug-in; and wherein the sending an operating system service request is performed by the plug-in.

12. A computing device comprising:
a memory,
an operating system including:
  a file system; and
  a kernel containing a security module, wherein the security module is configured to:
    receive, from an instance of a web browser, an operating system service request;
    run the operating system service request in a kernel of the operating system, wherein the operating system service request requests access to a resource of the operating system;
    retrieve a security context for the resource from a file system of the operating system; and
    apply a security policy based upon the security context and based upon information regarding the instance of a web browser, wherein the security policy grants access to the resource if a property or properties of the security context match a property or properties of the instance of the web browser.

13. The computing device of claim 12, wherein the resource is a cookie.

14. The computing device of claim 12, wherein the resource is a hardware device on the computing device on which the operating system is run.

15. The computing device of claim 14, wherein the computing device is a mobile phone.

16. A system comprising:
a memory,
a web browser;
a file system; and
an operating system containing a security module;
wherein the web browser is configured to:
  send an operating system service request to the operating system when the web browser needs to access a resource of the operating system;
  receive an indication as to whether the access is permitted from the operating system, based upon an access control security policy using a stored security context for the resource and a current context of the instance of the web browser; and
  accessing the resource only if the indication permits access to the resource;
wherein the security module is configured to:
  receive, from the web browser, the operating system service request;
  run the operating system service request by the operating system;
  retrieve a security context for the resource from a file system of the operating system; and
  apply a security policy based upon the security context and based upon information regarding the instance of a web browser, wherein the security policy grants access to the resource if a property or properties of the security context match a property or properties of an instance of the web browser.

17. An apparatus for running an operating system on a device, the apparatus comprising:
means for receiving, from an instance of a web browser, an operating system service request;
means for running the operating system service request by an operating system, wherein the operating system service request requests access to a resource of the operating system;
means for retrieving a security context for the resource from a file system of the operating system; and
means for applying an access control security policy based upon the security context and based upon information regarding the instance of a web browser, wherein the security policy grants access to the resource if a property or properties of the security context match a property or properties of the instance of the web browser.

18. A program storage device readable by a machine tangibly embodying a program of instructions executable by the machine to perform a method for running an operating system on a device, the method comprising:
receiving, from an instance of a web browser, an operating system service request;
running the operating system service request by an operating system, wherein the operating system service request requests access to a resource of the operating system;
retrieving a security context for the resource from a file system of the operating system; and
applying an access control security policy based upon the security context and based upon information regarding the instance of a web browser, wherein the security policy grants access to the resource if a property or properties of the security context match a property or properties of the instance of the web browser.

* * * * *